US012749958B2

(12) United States Patent
Huang et al.

(10) Patent No.: US 12,749,958 B2
(45) Date of Patent: Sep. 29, 2026

(54) VIBRATION MODULE

(71) Applicant: Primax Electronics Ltd., Taipei (TW)

(72) Inventors: Wei-Chiang Huang, Taipei (TW); Wei-Ping Chan, Taipei (TW); Tse-Ping Kuan, Taipei (TW); Ming-Hui Yeh, Taipei (TW); Ying-Yen Huang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 144 days.

(21) Appl. No.: 18/952,891

(22) Filed: Nov. 19, 2024

(65) Prior Publication Data

US 2025/0253749 A1 Aug. 7, 2025

(30) Foreign Application Priority Data

Feb. 7, 2024 (TW) ................................ 113105080

(51) Int. Cl.
*H02K 33/18* (2006.01)
*H02K 11/01* (2016.01)

(52) U.S. Cl.
CPC ......... *H02K 33/18* (2013.01); *H02K 11/0141* (2020.08)

(58) Field of Classification Search
CPC ..... H02K 33/18; H02K 11/0141; H02K 33/16
USPC ........................................................... 310/28
See application file for complete search history.

(56) References Cited

U.S. PATENT DOCUMENTS

| | | | | |
|---|---|---|---|---|
| 8,519,573 B2 * | 8/2013 | Keisuke | H02K 33/16 | 310/15 |
| 9,496,777 B2 * | 11/2016 | Jung | B06B 1/045 | |
| 10,033,245 B2 * | 7/2018 | Lee | H02K 7/08 | |
| 11,025,145 B2 * | 6/2021 | Kim | F16F 1/185 | |
| 2010/0052578 A1 * | 3/2010 | Kim | H02P 25/032 | 310/25 |
| 2011/0193426 A1 * | 8/2011 | Chung | H02K 33/16 | 310/25 |
| 2016/0243589 A1 * | 8/2016 | Mori | H02K 33/18 | |
| 2018/0026507 A1 * | 1/2018 | Mao | B06B 1/045 | 310/12.21 |
| 2023/0198362 A1 * | 6/2023 | Hirata | H02K 33/02 | 310/36 |
| 2025/0253749 A1 * | 8/2025 | Huang | H02K 11/0141 | |

* cited by examiner

*Primary Examiner* — Ahmed Elnakib
(74) *Attorney, Agent, or Firm* — KIRTON McCONKIE; Evan R. Witt

(57) ABSTRACT

A vibration module is installed in a touch plate. The vibration module includes a housing, a magnetic element, a coil layer and a base plate. The housing includes an accommodation space and an elastic structure. The magnetic element and the coil layer are aligned with each other and disposed within the accommodation space. The base plate is connected with the housing. In addition, the magnetic element and the coil layer are sealed in the accommodation space. The base plate is connected with the housing to seal the magnetic element and the coil layer in the accommodation space. The elastic structure is extended in the direction toward the accommodation space and connected with the magnetic element. The magnetic element is pushed to be close to the coil layer by the elastic structure. When the coil layer is electrically conducted, the magnetic element senses the coil layer and vibrates.

10 Claims, 6 Drawing Sheets

VIBRATION MODULE

FIELD OF THE INVENTION

The present invention relates to a vibration device, and more particularly to a vibration module for a touch panel.

BACKGROUND OF THE INVENTION

Nowadays, in many touch pads, vibration modules are used to replace conventional mechanical keys. When the user presses the touch pad, the vibration generated by the vibration module provides the user with a vibration feedback feel. Furthermore, the known vibration module has a vibration element inside the module. Under the influence of the magnetic force or in the power on status, the vibration element will produce continuous and repeated displacement, rotation or deformation to result in a vibration effect. The vibration effect will be transmitted to the outside through other components in the vibration module. The vibration module can be installed on the touch pad to provide the vibration function.

However, as the demand for a thinner touch pad gradually increases, the conventional vibration module has some drawbacks. For example, since the vibration element and internal structures in the conventional vibration module are relatively large in volume, the thickness of the entire vibration module is increased. After the vibration module is installed in the touch pad, the increase of overall thickness and volume of the touch pad does not meet the current slimness requirements. Furthermore, the components in the vibration module are complicated. The process of assembling many different types of components in a small module makes the manufacturing process complicated and increases the manufacturing cost. Due to assembling errors, it is also easy to produce defective products.

SUMMARY OF THE INVENTION

For solving the drawbacks of the conventional technologies, the present invention provides a vibration module. The vibration module includes a housing with an elastic structure, a magnetic element with a weight, and a coil layer corresponding to the magnetic element. When the magnetic element responds to the coil layer inside the module, the magnetic element vibrates. Since the magnetic element has the weight, the inertia of the magnetic element after starting to shake can provide a stable and more sustained vibration effect, and the overall structure is simplified to make the module thinner. Furthermore, the elastic structure of the housing is directly connected with the magnetic element to provide the efficacy of supporting the magnetic element and transmitting the vibration energy. Through the elastic structure, the distance between the magnetic element and the coil layer is correspondingly controlled. Consequently, the vibration amplitude generated after responding to the coil layer can be adjusted, and the vibration energy can be directly transmitted to the entire module. Due to this structural design, the vibration energy can be transmitted to the outside immediately. Furthermore, since the elastic structure is integrally formed with the housing, a smaller number of components are required. Consequently, the installation complexity and the manufacturing process will be simplified.

In accordance with an aspect of the present invention, a vibration module is provided. The vibration module includes a housing, a magnetic element, a coil layer and a base plate.

The housing includes an accommodation space, an opening, a surface structure and an elastic structure. The accommodation space is connected with the opening. The surface structure is aligned with the accommodation space. The elastic structure is disposed on the surface structure. The magnetic element is disposed within the accommodation space of the housing and aligned with the elastic structure. The coil layer is disposed within the accommodation space of the housing and aligned with the magnetic element. The base plate is disposed within the opening of the housing. The accommodation space is covered and shielded by the base plate. The elastic structure of the housing is extended from the surface structure of the housing and extended in a direction toward the accommodation space. The elastic structure is connected with the magnetic element. The magnetic element is pushed to be close to the coil layer by the elastic structure. When the coil layer conducts electricity, the magnetic element responds to the coil layer and vibrates, and a vibration generated by the magnetic element is transmitted to the housing and the base plate through the elastic structure.

In an embodiment, the elastic structure of the housing includes a fixed portion, an elastic arm and a contact portion. The fixed portion is formed on the surface structure of the housing. The elastic arm is connected with the fixed portion and extended in the direction toward the accommodation space of the housing. The contact portion is disposed within the accommodation space and connected with the elastic arm. The contact portion is contacted with the magnetic element.

In an embodiment, the housing includes an outer periphery portion and a central portion. The outer periphery portion is in parallel with the surface structure. The central portion is located near the accommodation space of the housing. The fixed portion of the elastic structure is formed on an outer periphery portion of the surface structure of the housing. The contact portion of the elastic structure is located at the central portion of the surface structure. The elastic arm of the elastic structure is extended from the fixed portion to the central portion of the surface structure along an inner side of the outer periphery portion of the surface structure.

In an embodiment, the surface structure of the housing includes a hollow groove. The hollow groove is formed in the surface structure and arranged around and beside the elastic arm of the elastic structure. The accommodation space is in communication with an outside of the vibration module through the hollow groove.

In an embodiment, the elastic structure of the housing is directly formed on the surface structure of the housing as an integral structure by a stamping process, a cutting process, an etching process or a plastic injection molding process.

In an embodiment, a vibration direction of the magnetic element and the extension direction of the elastic structure are identical.

In an embodiment, a magnetic pole arrangement direction of the magnetic element and the extension direction of the elastic structure are identical.

In an embodiment, the base plate is buried in the coil layer.

In an embodiment, the base plate has a top surface and a bottom surface, the coil layer includes a first coil, a second coil and a bent portion. The top surface of the base plate corresponds to the accommodation space of the housing. The bottom surface is opposed to the top surface with respect to the base plate. The first coil and the second coil of the coil layer are connected to each other through the bent portion. The first coil of the coil layer is formed on the top surface of the base plate. The second coil of the coil layer is disposed on the bottom surface of the base plate. The base plate is sandwiched between the first coil and the second coil.

In an embodiment, the housing includes a plurality of first engaging structures, and the base plate includes a plurality of second engaging structures corresponding to the plurality of first engaging structures. The plurality of first engaging structures of the housing are engaged with the plurality of second engaging structures of the base plate. Consequently, the base plate is fixed in the opening of the housing.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments and accompanying drawings.

Figure 1:
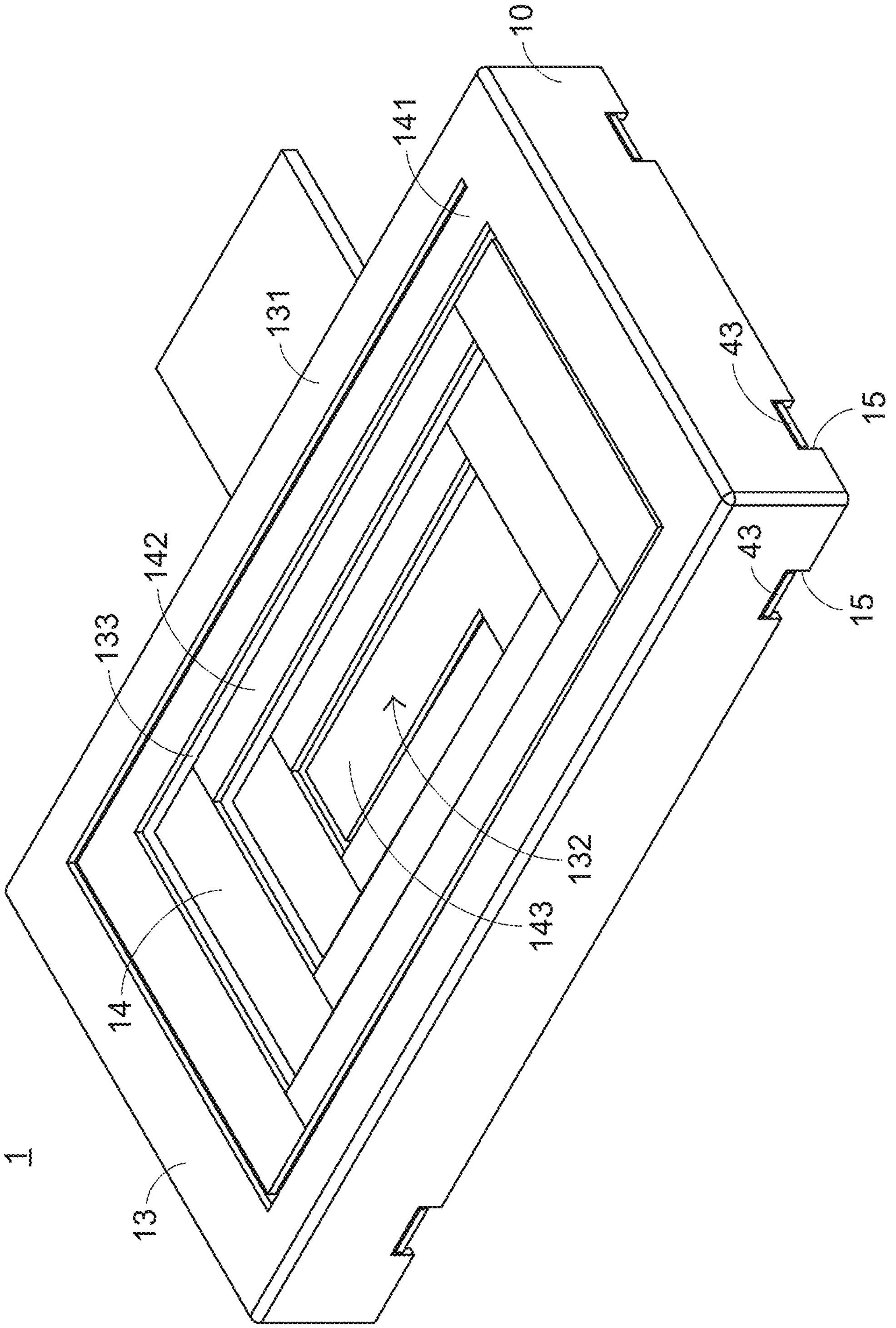
FIG. 1 is a schematic perspective view illustrating a vibration module according to a first embodiment of the present invention.
Figure 2:
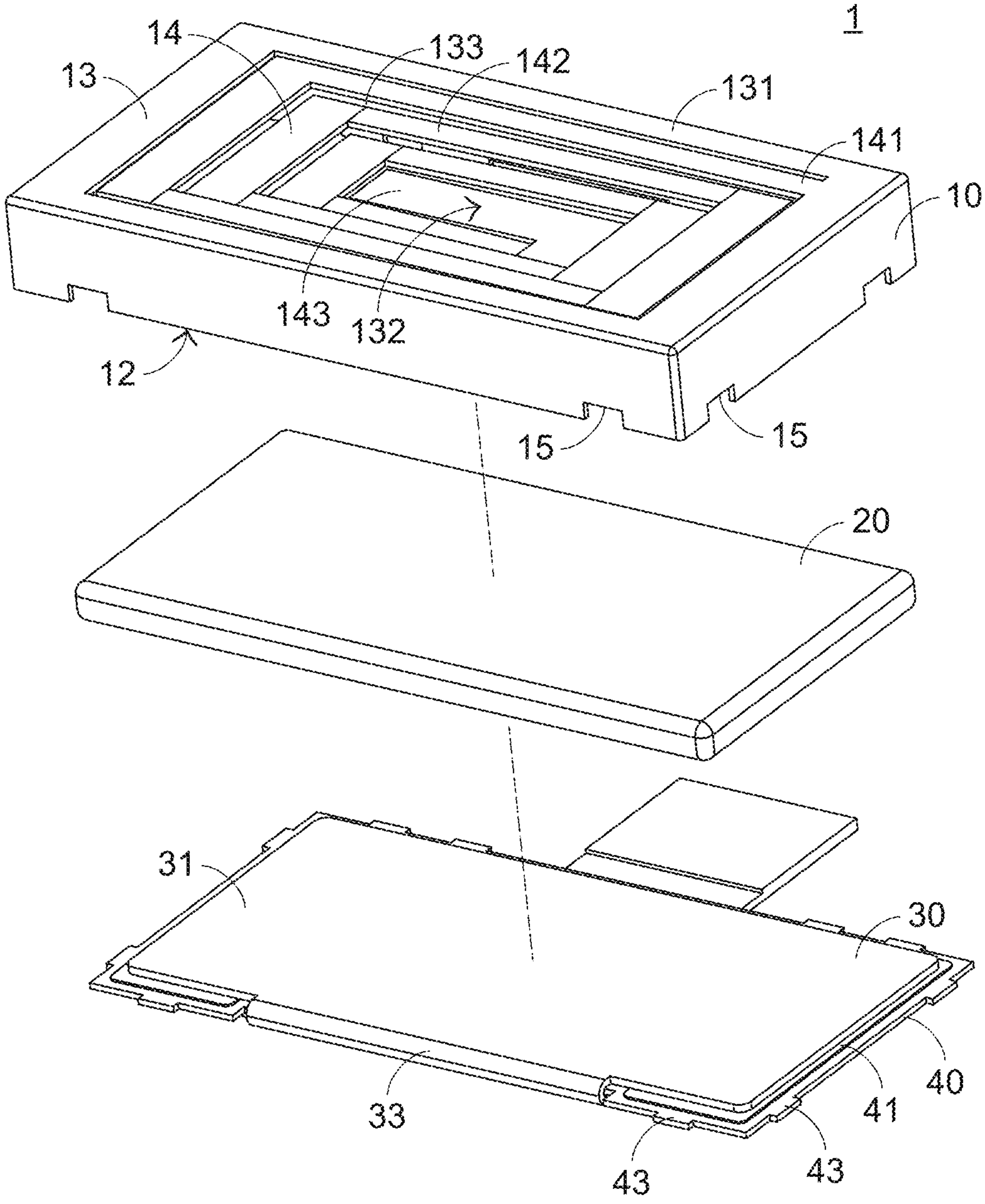
FIG. 2 is a schematic exploded view illustrating the vibration module according to the first embodiment of the present invention.
Figure 3:
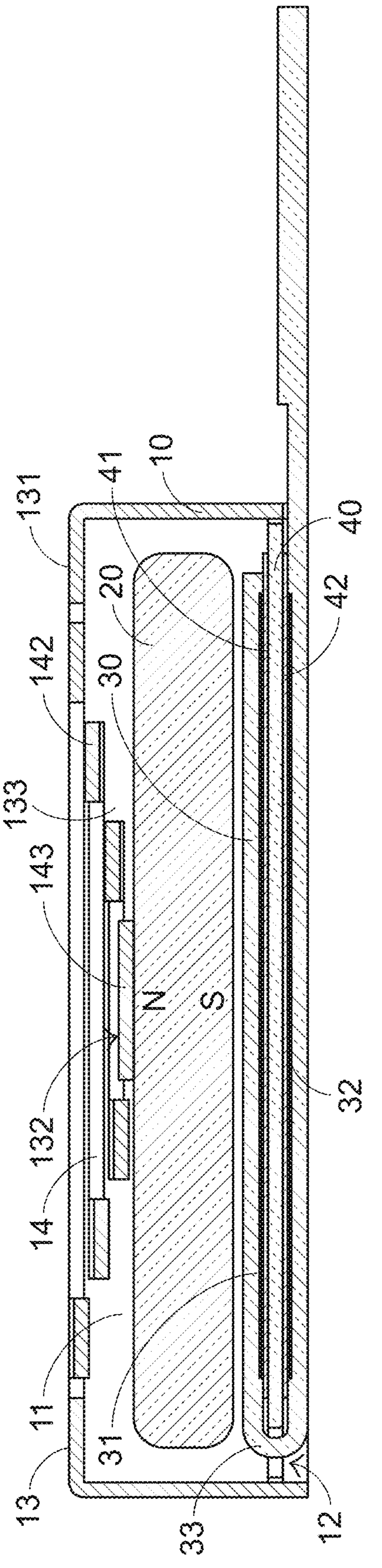
FIG. 3 is a schematic cross-sectional view illustrating the vibration module according to the first embodiment of the present invention.

The present invention provides a vibration module. FIG. 1 is a schematic perspective view illustrating a vibration module according to a first embodiment of the present invention. FIG. 2 is a schematic exploded view illustrating the vibration module according to the first embodiment of the present invention. FIG. 3 is a schematic cross-sectional view illustrating the vibration module according to the first embodiment of the present invention.

The vibration module 1 includes a housing 10, a magnetic element 20, a coil layer 30 and a base plate 40. The housing 10 includes an accommodation space 11, an opening 12, a surface structure 13 and an elastic structure 14. The accommodation space 11 of the housing 10 is connected with the opening 12. Consequently, the accommodation space 11 can be in communication with the outside through the opening 12. The surface structure 13 of the housing 10 is aligned with the accommodation space 11. The elastic structure 14 is disposed on the surface structure 13. The magnetic element 20 is disposed within the accommodation space 11 of the housing 10 and aligned with the elastic structure 14. The coil layer 30 is disposed within the accommodation space 11 of the housing 10 and aligned with the magnetic element 20. The base plate 40 is connected with the coil layer 30 and disposed within the opening 12 of the housing 10. In addition, the accommodation space 11 is covered and shielded by the base plate 40.

The elastic structure 14 of the housing 10 is extended from the surface structure 13 in the direction toward the accommodation space 11 and inserted into the accommodation space 11. The elastic structure 14 is connected with the magnetic element 20 inside the accommodation space 11. In addition, the magnetic element 20 is pushed to be close to the coil layer 30 by the elastic structure 14. When the coil layer 30 conducts electricity, the magnetic element 20 responds to the charged coil layer 30 and vibrates. The vibration generated by the magnetic element 20 will be transmitted to the housing 10 and the base plate 40 through the elastic structure 14.

According to the principle of electromagnetic induction, the magnetic element 20 induces the coil layer 30 to vibrate. Since the magnetic element 20 itself has a certain weight, the magnetic element 20 can be used as a weight to maintain the vibration stability. Furthermore, the amplitude and force of the vibration can be adjusted through the adjustment of the weight of the magnetic element 20. The elastic structure 14 of the housing 10 is directly formed on the surface structure 13 of the housing 10 in an integral formation manner by a stamping process, a cutting process, an etching process or a plastic injection molding process. Since the housing 10 and the elastic structure 14 are formed as an integrally structure and the elastic structure 14 is extended from the housing 10, the elastic structure 14 has a stable structure and is not easy to break. Furthermore, since it is not necessary to provide an additional structure to fix the elastic structure 14 to the housing 10, the overall module is light and thin. Since the vibration energy can be transmitted to the housing 10 and the base plate 40 through the elastic structure 14 immediately, the arrangement of the elastic structure 14 is helpful for vibration transmission.

In an embodiment, the surface structure 13 of the housing 10 has an outer periphery portion 131, a central portion 132 and a hollow groove 133. The elastic structure 14 includes a fixed portion 141, an elastic arm 142 and a contact portion 143. The outer periphery portion 131 is arranged around the edges of the surface structure 13 of the housing 10 and in parallel with the surface structure 13 of the housing 10. The central portion 132 is located near the accommodation space 11 of the housing 10. The fixed portion 141 of the elastic structure 14 is formed on the surface structure 13 of the housing 10 and located near the outer periphery portion 131. The elastic arm 142 is connected with the fixed portion 141 and extended in the direction toward the accommodation space 11 of the housing 10. The contact portion 143 is disposed within the accommodation space 11 and connected with the elastic arm 142. In addition, the contact portion 143 is contacted with the magnetic element 20 inside the accommodation space 11.

As mentioned above, the fixed portion 141 of the elastic structure 14 is formed on the surface structure 13 of the housing 10 and located near the outer periphery portion 131, and the contact portion 143 of the elastic structure 14 is located at the central portion 132 of the surface structure 13. The elastic arm 142 of the elastic structure 14 is extended from the fixed portion 141 to the central portion 132 of the surface structure 13 along an inner side of the outer periphery portion 131 of the surface structure 13. In addition, the elastic arm 142 is inserted into the accommodation space 11 and connected with the contact portion 143, and the elastic arm 142 is connected with the magnetic element 20 through the contact portion 143. The hollow groove 133 of the surface structure 13 of the housing 10 is formed in the surface structure 13 and arranged around and beside the elastic arm 142 of the elastic structure 14. The accommodation space 11 is in communication with the outside through the hollow groove 133. Due to the arrangement of the hollow groove 133, the elasticity and mobility of the elastic arm 142 will be increased. Consequently, the elastic deformation capability and the swinging space for the elastic arm 142 will be enhanced.

The magnetic pole arrangement direction of the magnetic element 20 is the same as the extension direction of the elastic structure 14. As shown in FIG. 3, the elastic structure 14 is extended from the surface structure 13 and inserted into the accommodation space 11. That is, the elastic structure 14 is extended in the vertical direction. Correspondingly, the two magnetic poles (i.e., the N pole and the S pole) of the magnetic element 20 are arranged in the vertical direction. The two magnetic poles of the magnetic element 20 are the parts with the strongest magnetism. This magnetic pole arrangement direction of the magnetic element 20 corresponds to the extension direction of the elastic structure 14. Consequently, when the magnetic element 20 is pushed to be close to the coil layer 30 by the elastic structure 14, the sensing distance control efficacy will be enhanced, and the magnetic sensing effect will be optimized. For example, as shown in FIG. 3, the N pole and the S pole of the magnetic element 20 are specially arranged. That is, the upper N pole is close to the surface structure 13, and the lower S pole is close to the interior of the accommodation space 11. That is, the arrangement direction of the N pole and the S pole corresponds to the extension direction of the elastic structure 14. It is noted that numerous modifications may be made. For example, in a variant example, the upper magnetic pole is the S pole, and the lower magnetic pole is the N pole. The number of the magnetic element 20 is not restricted as long as the magnetic pole arrangement direction of the magnetic element 20 is the same as the extension direction of the elastic structure 14.

Furthermore, the vibration direction of the magnetic element 20 is the same as the extension direction of the elastic structure 14. Please refer to FIG. 3 again. Since the elastic structure 14 is contacted with the magnetic element 20 and pushed against the magnetic element 20, the position of the magnetic element 20 is limited. That is, the position of the magnetic element 20 in the accommodation space 11 is limited by the elastic structure 14, and the distance between the magnetic element 20 and the coil layer 30 is correspondingly determined. As shown in FIG. 3, the elastic structure 14 is extended from the surface structure 13 to interior of the accommodation space 11 in the vertical direction. Consequently, the elastic arm 142 of the elastic structure 14 is well stretched and restored and elastically deformed in this direction. Due to the magnetic pole arrangement direction of the magnetic element 20, the magnetic element 20 connected with the elastic structure 14 vibrates in the same direction as the extension direction of the elastic structure 14. Consequently, the magnetic element 20 vibrates back and forth along the vertical direction from the surface structure 13 to the accommodation space 11.

Figure 4:
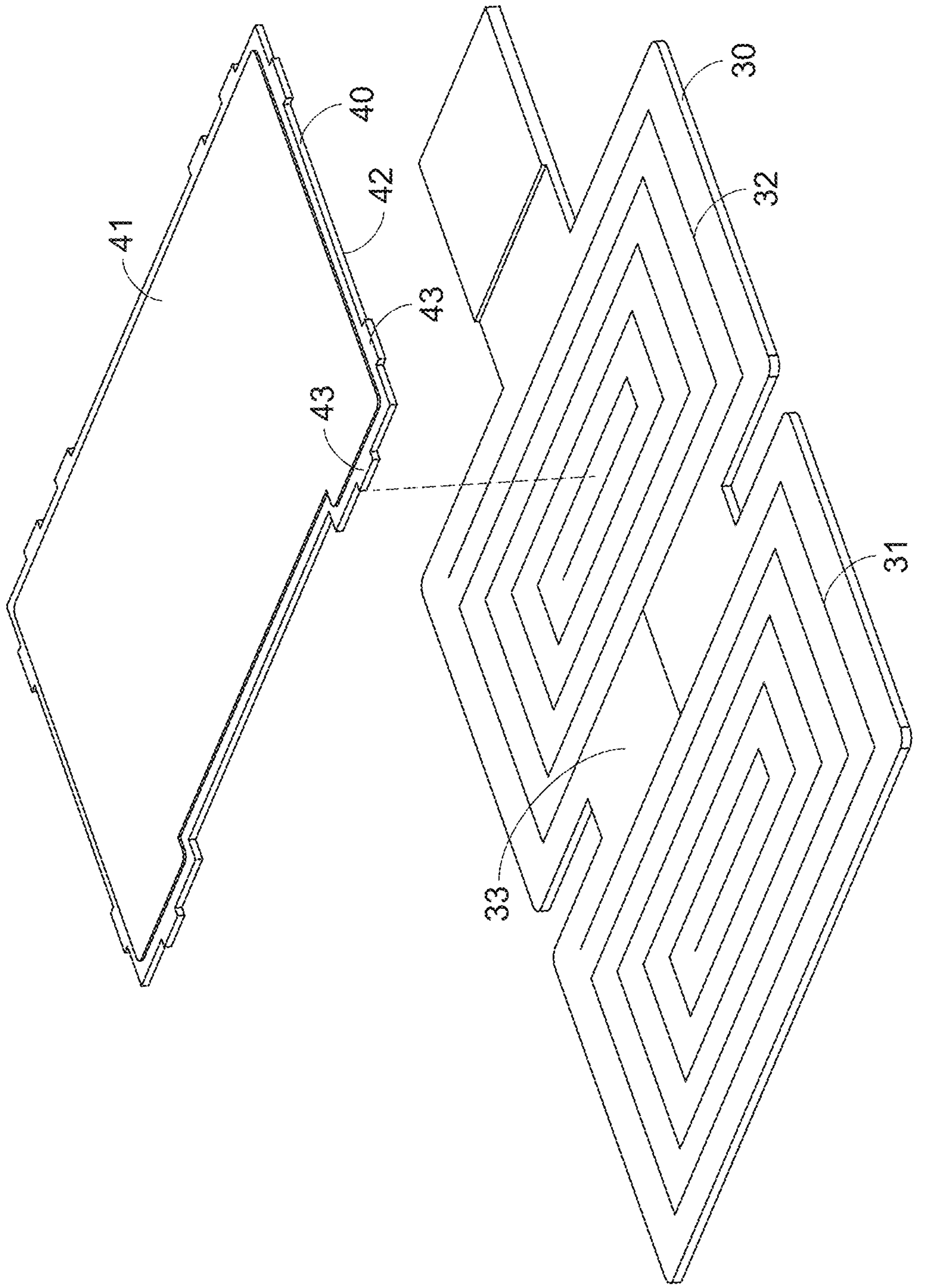
FIG. 4 schematically illustrates the coil layer and the base plate of the vibration module according to the first embodiment of the present invention, in which the coil layer is in an unfolded state.

The arrangement of the coil layer and the base plate will be illustrated in more details as follows. FIG. 4 schematically illustrates the coil layer and the base plate of the vibration module according to the first embodiment of the present invention, in which the coil layer is in an unfolded state.

Please refer to FIG. 4 and also refer to FIG. 2. The base plate 40 is buried in the coil layer 30. In an embodiment, the housing 10 further includes a plurality of first engaging structures 15. The first engaging structures 15 are formed on the surface structure 13 of the housing 10 and located beside the opening 12. The base plate 40 includes a top surface 41, a bottom surface 42 and a plurality of second engaging structures 43. The coil layer 30 includes a first coil 31, a second coil 32 and a bent portion 33.

The top surface 41 of the base plate 40 corresponds to the accommodation space 11 of the housing 10. The bottom surface 42 is opposed to the top surface 41 with respect to the base plate 40. The first coil 31 and the second coil 32 of the coil layer 30 are connected with each other through the bent portion 33. The coil layer 30 is connected with the base plate 40. The first coil 31 of the coil layer 30 is disposed on the top surface 41 of the base plate 40. Since the bent portion 33 is bendable, the second coil 32 of the coil layer 30 is movably disposed on the bottom surface 42 of the base plate 40. Consequently, the base plate 40 is sandwiched between the first coil 31 and the second coil 32. In accordance with this design, the first coil 31 and the second coil 32 of the coil layer 30 are disposed within the accommodation space 11, and the second coil 32 is close to the opening 12 and exposed to the outside. Therefore, the conductive contacts and the circuitry structure of the coil layer 30 can be designed in a more convenient manner and electrically connected with the external circuit directly without any additional conducting structure. Furthermore, due to this design, the coil layer 30 can be fixed in the base plate 40 and not readily detached.

The plurality of first engaging structures 15 of the housing 10 correspond to the plurality of second engaging structures 43 of the base plate 40. Due to the engagement between the second engaging structures 43 of the base plate 40 and the corresponding first engaging structures 15 of the housing 10, the base plate 40 can be disposed and fixed in the opening 12 of the housing 10 to cover the accommodation space 11.

Figure 5:
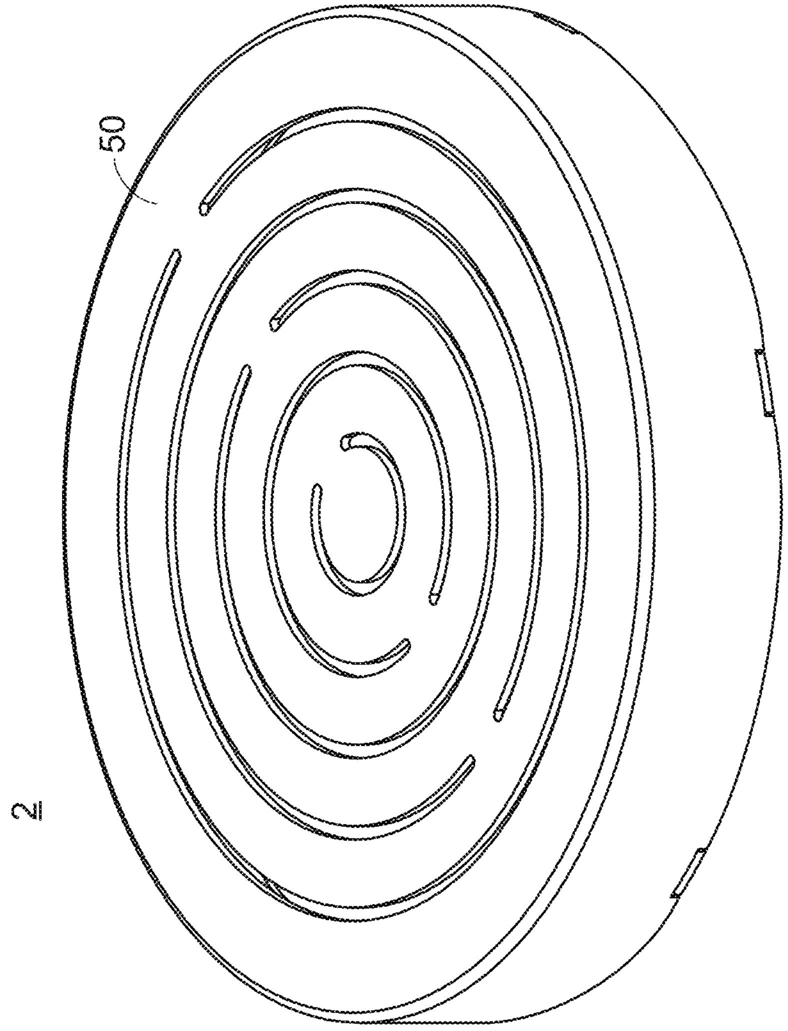
FIG. 5 is a schematic perspective view illustrating a vibration module according to a second embodiment of the present invention.
Figure 6:
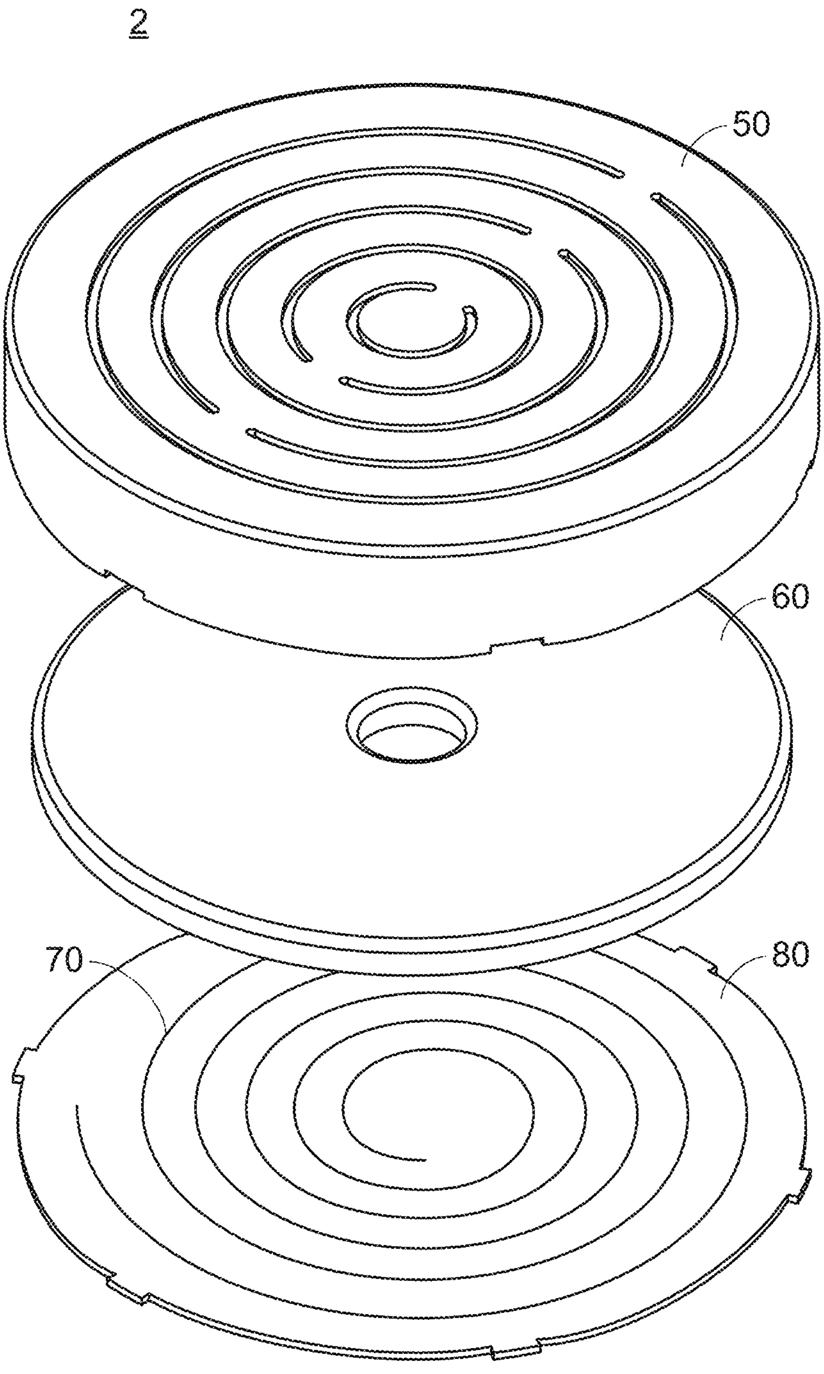
FIG. 6 is a schematic exploded view illustrating the vibration module according to the second embodiment of the present invention.

FIG. 5 is a schematic perspective view illustrating a vibration module according to a second embodiment of the present invention. FIG. 6 is a schematic exploded view illustrating the vibration module according to the second embodiment of the present invention.

The technical contents and operations of the vibration module of the second embodiment are similar to those of the first embodiment. For brevity, only the distinguished aspects will be described as follows. In comparison with the first embodiment, the structural shape of the vibration module of the second embodiment is distinguished. In the second embodiment, the vibration module 2 has a circular cross section.

In this embodiment, the vibration module 2 includes a housing 50, a magnetic element 60, a coil layer 70 and a base plate 80. The housing 50 has a cylindrical shape. The magnetic element 60 is a ring-type magnet. The coil layer 70 is wound along a circular trajectory. In addition, the base plate is a circular sheet. The housing 50 is connected with the magnetic element 60. The magnetic element 60 is disposed within the housing 50 and aligned with the coil layer 70. The coil layer 70 is disposed on the base plate 80. The base plate 80 is connected with the housing 50, and thus the magnetic element 60 and the coil layer 70 are sealed in the housing 50. When the coil layer 70 conducts electricity, the magnetic element 60 responds to the charged coil layer 70 and vibrates. The vibration generated by the magnetic element 60 will be transmitted to the outside through the housing 50.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A vibration module, comprising:

a housing comprising an accommodation space, an opening, a surface structure and an elastic structure, wherein the accommodation space is connected with the opening, the surface structure is aligned with the accommodation space, and the elastic structure is disposed on the surface structure;

a magnetic element is disposed within the accommodation space of the housing and aligned with the elastic structure;

a coil layer is disposed within the accommodation space of the housing and aligned with the magnetic element; and a base plate is disposed within the opening of the housing, wherein the accommodation space is covered and shielded by the base plate, wherein the elastic structure of the housing is extended from the surface structure of the housing and extended in a direction toward the accommodation space, the elastic structure is connected with the magnetic element, and the magnetic element is pushed to be close to the coil layer by the elastic structure, wherein when the coil layer conducts electricity, the magnetic element responds to the coil layer and vibrates, and a vibration generated by the magnetic element is transmitted to the housing and the base plate through the elastic structure.

2. The vibration module according to claim 1, wherein the elastic structure of the housing comprises a fixed portion, an elastic arm and a contact portion, wherein the fixed portion is formed on the surface structure of the housing, the elastic arm is connected with the fixed portion and extended in the direction toward the accommodation space of the housing, the contact portion is disposed within the accommodation space and connected with the elastic arm, and the contact portion is contacted with the magnetic element.

3. The vibration module according to claim 2, wherein the housing comprises an outer periphery portion and a central portion, wherein the outer periphery portion is in parallel with the surface structure, the central portion is located near the accommodation space of the housing, the fixed portion of the elastic structure is formed on an outer periphery portion of the surface structure of the housing, the contact portion of the elastic structure is located at the central portion of the surface structure, and the elastic arm of the elastic structure is extended from the fixed portion to the central portion of the surface structure along an inner side of the outer periphery portion of the surface structure.

4. The vibration module according to claim 2, wherein the surface structure of the housing comprises a hollow groove, wherein the hollow groove is formed in the surface structure and arranged around and beside the elastic arm of the elastic structure, and the accommodation space is in communication with an outside of the vibration module through the hollow groove.

5. The vibration module according to claim 1, wherein the elastic structure of the housing is directly formed on the surface structure of the housing as an integral structure by a stamping process, a cutting process, an etching process or a plastic injection molding process.

6. The vibration module according to claim 1, wherein a vibration direction of the magnetic element and the extension direction of the elastic structure are identical.

7. The vibration module according to claim 1, wherein a magnetic pole arrangement direction of the magnetic element and the extension direction of the elastic structure are identical.

8. The vibration module according to claim 1, wherein the base plate is buried in the coil layer.

9. The vibration module according to claim 1, wherein the base plate has a top surface and a bottom surface, and the coil layer comprises a first coil, a second coil and a bent portion, wherein the top surface of the base plate corresponds to the accommodation space of the housing, the bottom surface is opposed to the top surface with respect to the base plate, and the first coil and the second coil of the coil layer are connected to each other through the bent portion, wherein the first coil of the coil layer is formed on the top surface of the base plate, the second coil of the coil layer is disposed on the bottom surface of the base plate, and the base plate is sandwiched between the first coil and the second coil.

10. The vibration module according to claim 1, wherein the housing comprises a plurality of first engaging structures, and the base plate comprises a plurality of second engaging structures corresponding to the plurality of first engaging structures, wherein the plurality of first engaging structures of the housing are engaged with the plurality of second engaging structures of the base plate, so that the base plate is fixed in the opening of the housing.

* * * * *